United States Patent

[11] 3,604,390

| [72] | Inventor | Earl Donald Zuck<br>Quakertown, Pa. |
|---|---|---|
| [21] | Appl. No. | 53,496 |
| [22] | Filed | July 9, 1970 |
| [45] | Patented | Sept. 14, 1971 |
| [73] | Assignee | Ametek, Inc.<br>New York, N.Y. |

[54] ECCENTRIC MICROADJUSTABLE POINTER
4 Claims, 3 Drawing Figs.
[52] U.S. Cl. ...................................................... 116/136.5,
116/129 A, 324/154 PB, 346/139 C
[51] Int. Cl. ...................................................... G01d 13/22
[50] Field of Search ........................................... 116/129 R,
136.5; 58/126 R, 126 D, 113; 346/139 C; 324/154

[56] References Cited
UNITED STATES PATENTS

| 2,136,364 | 11/1938 | Lincoln .......................... | 116/129 A |
| 2,319,782 | 5/1943 | Rourke .......................... | 116/129 |
| 2,637,970 | 5/1953 | Kocher .......................... | 58/113 |
| 2,906,233 | 9/1959 | Reussenzehn et al. .......... | 116/129 |
| 2,963,651 | 12/1960 | Richards et al. ............... | 324/154 |
| 3,339,520 | 9/1967 | Maier ............................ | 116/136.5 |

Primary Examiner—Louis J. Capozi
Attorney—Smythe & Moore

ABSTRACT: An indicator pointer has an adjusting mechanism including a spring plate fixedly mounted around a central bushing about which the pointer pivots. An eccentric adjusting member positioned on one side of the bushing is connected to the spring plate which is locked in its adjusted position by a locking member rotatably mounted in the pointer on the other side of the bushing.

PATENTED SEP 14 1971

3,604,390

INVENTOR
EARL DONALD ZUCK
BY
Smythe & Moore
ATTORNEYS

ECCENTRIC MICROADJUSTABLE POINTER

One form of a gauge comprises an indicator pointer which moves over a graduated scale and is mounted on a shaft movable in response to a sensed condition. Such gauges, which include pressure gauges, are often subjected to excessive vibrations and other influences which tend to affect readings of the gauge as the pointer moves over the scale. A gauge which is accurately calibrated upon leaving the factory may change in operation over a few months to give readings which are plus or minus from the actual condition as sensed by the gauge. It also occurs that when a condition is suddenly released from the gauge, the pointer may return to its zero position at such a speed that the impact of the pointer against the stop pin may dislodge the pointer upon its shaft. In order to correct such a displacement of the pointer upon the shaft, it has been necessary to remove the pointer from the shaft, reposition the pointer in its correct position and then replace the pointer back upon the shaft. However, it is difficult to replace the pointer exactly in the desired position, and therefore inaccuracies are introduced which cannot be tolerated, particularly when a high degree of accuracy in the gauge is desired. It has, therefore, been proposed to mount the pointers on the shaft in such a manner that the pointer may still be moved with respect to the shaft without being removed therefrom. While such adjusting mechanisms were an improvement over a repositioning of the pointer on the shaft, they were not completely satisfactory since they often included a number of small components which depended on friction between the components to retain the adjustment. Further, the number and small size of the parts made the fabrication and assembly of the parts into the adjusting instrument a relatively expensive operation.

One of the objects of the present invention is to provide an improved adjusting mechanism for an indicator pointer.

Another of the objects of the present invention is to provide an adjustable pointer mechanism which is simple and reliable in operation and which comprises a minimum of parts.

Another object of the invention is to provide an adjustment which can be positively locked in place and which does not depend on friction alone to prevent the pointer from changing its position with respect to the pointer bushing.

According to one aspect of the present invention, an adjusting mechanism for an indicator pointer may comprise a bushing having an opening therethrough for mounting on a shaft and a pointer attached to the bushing, with the axis of the bushing opening being the axis of rotation of the pointer. Portions of the pointer extend on opposite sides of its rotary axis. A spring plate is fixedly mounted on the bushing and has a slotted end portion extending on one side of the pointer axis and a tab extending on the other side of the axis. An adjusting member is rotatably mounted in one end portion of the pointer and has an eccentric pin which is received in the slotted end of the spring plate. A locking member is rotatably mounted in the other end portion of the pointer and has a locking notch which is engageable with the tab of the spring plate to lock the spring plate in its adjusted position.

Other objects, advantages and features of the present invention will become apparent from the accompanying description and drawings, which are merely exemplary.

In the Drawings.

Proceeding next to the drawings wherein like reference symbols indicate the same parts throughout the various views, a specific embodiment of the present invention will be described in detail.

Figure 1:
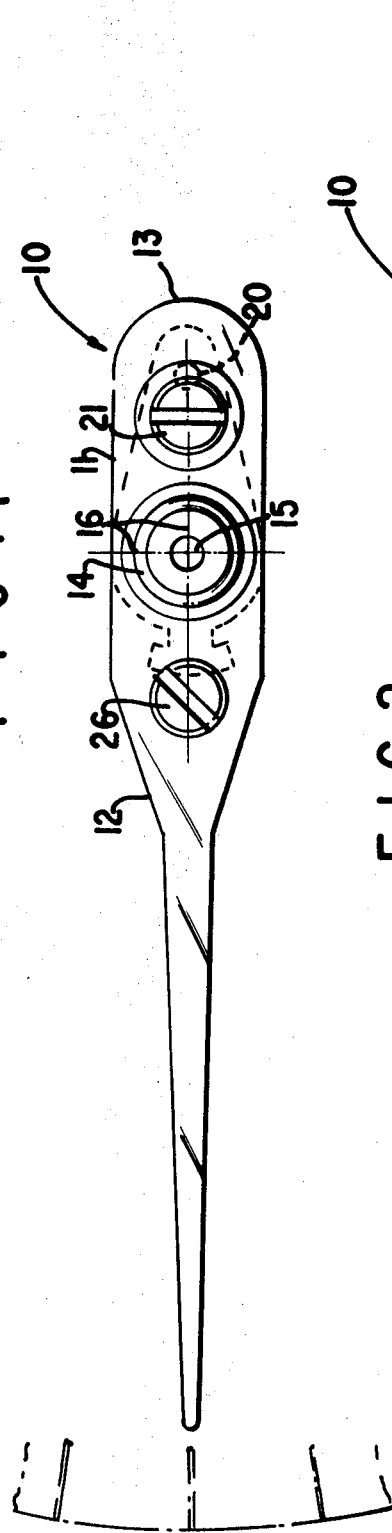
FIG. 1 is a top plan view of a pointer incorporating the adjusting mechanism according to the present invention.
Figure 2:
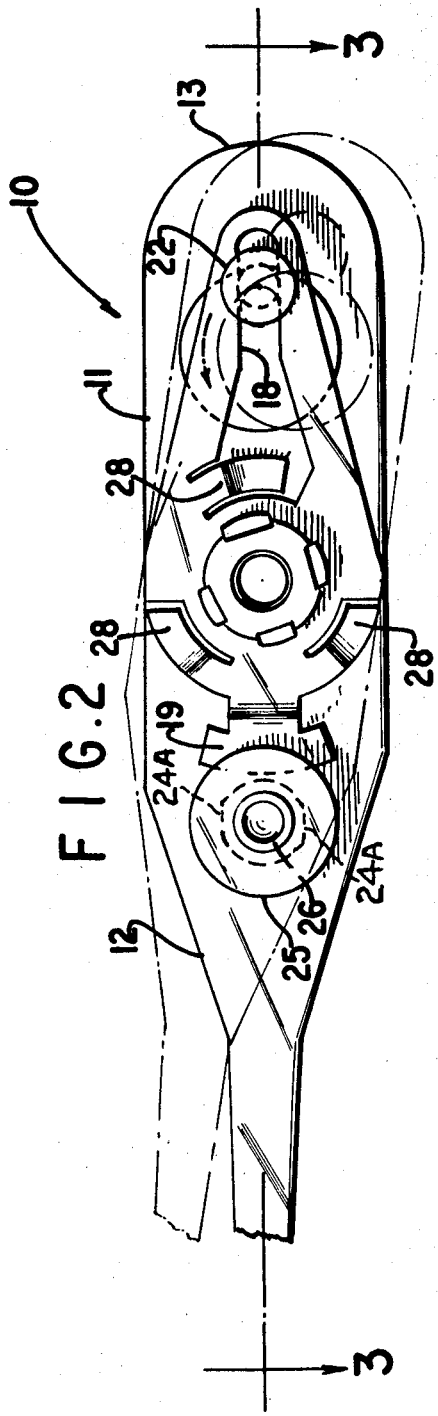
FIG. 2 is a bottom plan view of that portion of the pointer of FIG. 1 having the adjusting mechanism and in enlarged scale.
Figure 3:
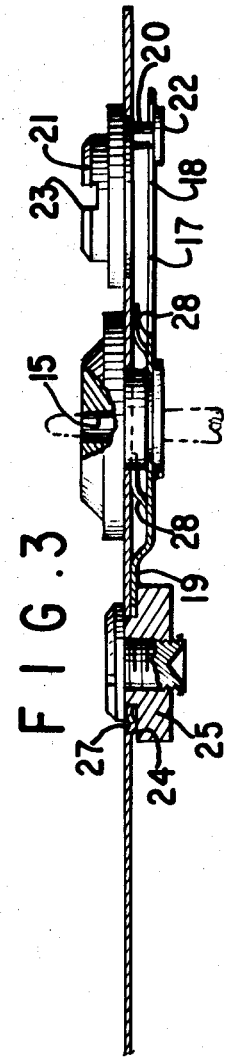
FIG. 3 is a sectional view taken along the line 3—3 of FIG. 2.

As may be seen in FIG. 1, a pointer which may be aluminum and which incorporates the present invention is indicated generally at 10 and has an enlarged central portion 11 having end portions 12 and 13.

A bushing or hub member 14 having an opening 15 therethrough is rotatably carried by the pointer. The longitudinal axis of the opening 15 as indicated at 16 is the axis about which the pointer rotates. The opening 15 may be slightly tapered to facilitate the mounting of this hub member upon a shaft or spindle of an instrument. After the hub member has been fixedly mounted upon the shaft, it remains in position, but the pointer will be able to pivot through a small angle in either direction by the adjusting mechanism which is to be presently described.

A spring plate 17 is fixedly mounted upon a smaller diameter portion of the hub 14 and has a slot 18 in one end portion and a bent tab 19 in the other end portion. The slot 18 receives an eccentric pin 20 of an adjusting member 21 rotatably mounted in an end portion 13 of the pointer. The lower end of the pin may be provided with a flanged element 22 so as to prevent a separation of the eccentric pin from the slot of the spring plate. The adjusting member 21 is provided with a diametrical slot 23 for receiving a suitable adjusting tool, such as a screwdriver. It can be seen that rotation of the adjusting member in either direction will bring about a rotation of the spring plate 17 with respect to the pointer.

The tab 19 of the plate 17 rests within a peripheral notch 24 formed on the upper edge of a locking nut 25 into which is threaded a bolt 26. Tightening of the bolt 26 will urge the locking nut 25 upwardly to tighten the spring plate 17 into position by means of a force exerted upon the tab. The locking bolt 26 is provided with a drilled end which can be staked over after the bolt is inserted in the nut 25, so that when an adjustment is made, the bolt cannot be inadvertently removed.

An indentation or rib 27 may be provided in the pointer which acts upon the peripheral notch 24 of the locking nut 25 oppositely from the tab. As a result of this rib 27, the locking nut 25 will remain substantially parallel to the pointer even when tightened against the tab.

Nut 25 is provided with two flats on the shoulder 24A formed by the peripheral notch 24. These flats cooperate with a similarly shaped hole in the pointer so as to prevent rotation of the nut 25 when bolt 26 is tightened.

The spring plate 17 may also be provided with a plurality of spring tabs 28 surrounding the hub 14 with the tabs engaging against the undersurface of the pointer. Spring tabs 28 provide friction between the spring plate 17 and the pointer 10 so that when the locking bolt 26 is loosened for the purpose of making an adjustment, contact will be maintained between the two parts so as to give the adjustment a certain amount of resistance or "feel." Further, the tabs 28 assist in maintaining the correct relation between the parts after the locking bolt is secured.

As a result of this adjusting mechanism, small adjustments of the pointer with respect to its shaft or spindle can be readily made without removing the pointer therefrom. By unloosening the locking bolt 26 a slight rotation of the adjusting member will cause the pointer 11 to pivot about the hub while the spring plate remains stationary since this plate is staked or otherwise fastened to the hub. Once the adjustment has been made the locking screw 26 is then tightened, and the locking nut 25 will bear against the tab 19 to retain the adjusted relationship between the spring plate and the pointer. Thus, in effect, the hub member and spring plate function as a single stationary unit with respect to the shaft while the pointer is rotated about the hub and the shaft because of the eccentric connection between the pointer and the spring plate.

It is readily apparent that this adjusting mechanism is simple and reliable and comprises a minimum of parts which can be easily fabricated and assembled.

It will be understood that various details of construction and arrangement of parts may be made without departing from the spirit of the invention except as defined in the appended claims.

What is claimed is:

1. An adjusting mechanism for an indicator pointer comprising a bushing having an opening therethrough for mounting on a shaft, a pointer attached to said bushing with the axis of the bushing opening defining the axis of rotation of the pointer, said pointer having end portions on opposite sides of its rotary axis, a spring plate fixedly mounted on said bushing and having a slotted end portion extending on one side of the pointer axis and a tab extending on the other side of said axis, an adjusting member rotatably mounted in one end portion of said pointer and having an eccentric pin thereon received in the slotted end of said spring plate, and a locking member rotatably mounted in the other end portion of said pointer and having a locking notch engageable with the tab of said spring plate to secure the spring plate in a position with respect to the pointer after the pointer has been rotated to a new position by means of the eccentric adjusting member.

2. An adjusting mechanism as claimed in claim 1 wherein said locking member comprises a locking nut having a peripheral notch to receive said tab, and a screw threaded into said locking nut to draw the locking nut toward the pointer to lock the tab in position.

3. An adjusting mechanism as claimed in claim 2 and comprising a raised portion in a pointer end portion having the height of said tab so that the locking nut acts against both the raised portion and the spring tab.

4. An adjusting mechanism as claimed in claim 2 wherein the locking nut has locking flat surface means and the pointer has flat surface means engageable with said locking nut flat surface means.